(12) United States Patent
Kim et al.

(10) Patent No.: US 10,571,161 B2
(45) Date of Patent: Feb. 25, 2020

(54) COOLING DEVICE

(71) Applicant: Electronics and Telecommunications Research Institute, Daejeon (KR)

(72) Inventors: Junsoo Kim, Daejeon (KR); Jungyun Kwon, Daejeon (KR); Seungeon Moon, Daejeon (KR); Seung Min Lee, Suwon-si (KR); Jaewoo Lee, Sejong-si (KR); Solyee Im, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 293 days.

(21) Appl. No.: 15/656,711

(22) Filed: Jul. 21, 2017

(65) Prior Publication Data
US 2018/0119999 A1    May 3, 2018

(30) Foreign Application Priority Data

Oct. 28, 2016  (KR) .................. 10-2016-0142205
Mar. 31, 2017  (KR) .................. 10-2017-0042091

(51) Int. Cl.
*F25B 19/00* (2006.01)
*F25B 39/02* (2006.01)
(Continued)

(52) U.S. Cl.
CPC .......... *F25B 19/00* (2013.01); *F16K 31/002* (2013.01); *F16K 99/0036* (2013.01);
(Continued)

(58) Field of Classification Search
CPC .............. F16K 99/0036; F16K 31/002; F16K 99/0055; F25B 19/00; F25B 39/024; F25B 41/04
See application file for complete search history.

(56) References Cited

U.S. PATENT DOCUMENTS 6,230,501 B1 *  5/2001  Bailey, Sr. ........... A43B 1/0054
                                              62/51.1
7,204,041 B1 *  4/2007  Bailey, Sr. ........... A43B 3/0005
                                              36/1
(Continued)

FOREIGN PATENT DOCUMENTS

KR    10-2007-0027902 A    3/2007
KR    10-2010-0135059 A    12/2010

OTHER PUBLICATIONS

Halil Tekin et al., "Responsive Micromolds for Sequential Patterning of Hydrogel Microstructures", *Journal of the American Chemical Society*, vol. 133, Jul. 18, 2011, p. 12944-12947.
(Continued)

*Primary Examiner* — Kun Kai Ma
(74) *Attorney, Agent, or Firm* — Rabin & Berdo, P.C.

(57) ABSTRACT

Provided is a cooling device including a valve structure including a temperature-responsive material that changes in volume in response to changes in temperature, a supporting structure, which is joined to the valve structure and supports the valve structure, and a solvent which contacts the valve structure, wherein a portion of the solvent contacts the valve structure and another portion of the solvent is externally exposed, the valve structure changes in volume in response to changes in temperature and thereby regulating the externally exposed surface area of the solvent.

10 Claims, 8 Drawing Sheets

(51) Int. Cl.
  *F25B 41/04*  (2006.01)
  *F16K 31/00*  (2006.01)
  *F16K 99/00*  (2006.01)

(52) U.S. Cl.
  CPC ........ *F16K 99/0055* (2013.01); *F25B 39/024* (2013.01); *F25B 41/04* (2013.01)

(56) References Cited

U.S. PATENT DOCUMENTS

| | | | |
|---|---|---|---|
| 7,971,633 | B2 | 7/2011 | Moon et al. |
| 8,156,570 | B1* | 4/2012 | Hockaday .......... A41D 13/0025 2/7 |
| 8,421,304 | B2* | 4/2013 | Hino .................... H01L 41/047 310/300 |
| 9,437,795 | B2 | 9/2016 | Jun et al. |
| 9,587,632 | B2* | 3/2017 | Dimascio ................. F03G 7/06 |
| 9,650,828 | B1 | 5/2017 | Weston ..................... E06B 9/24 |
| 9,896,240 | B2* | 2/2018 | Klann ................ B65D 81/2076 |
| 2007/0184238 | A1* | 8/2007 | Hockaday ................ B32B 7/00 428/98 |
| 2009/0149772 | A1 | 6/2009 | MacDonald et al. |
| 2011/0077527 | A1 | 3/2011 | Yang et al. |
| 2011/0192233 | A1* | 8/2011 | Aizenberg ........... B29C 39/026 73/861 |
| 2015/0093823 | A1* | 4/2015 | Sutton .................... C12M 25/02 435/375 |
| 2015/0270464 | A1* | 9/2015 | Jun ......................... H01L 35/34 136/204 |
| 2015/0308727 | A1* | 10/2015 | Iwamoto .................. F25D 5/00 62/4 |
| 2016/0051735 | A1* | 2/2016 | Slepian .................. A61N 1/326 600/301 |
| 2016/0109174 | A1* | 4/2016 | Millar .................... A61F 7/106 62/56 |
| 2017/0137283 | A1* | 5/2017 | Hamed ................. C01B 3/0015 |
| 2018/0214838 | A1* | 8/2018 | Baumberg ........... B01J 13/0034 |

OTHER PUBLICATIONS

T. Kokalj et al., "Biologically inspired porous cooling membrane using arrayed-droplets evaporation", *Applied Physics Letters*, vol. 96, Issue 16, Apr. 19, 2010, p. 163703-1-163703-3.

* cited by examiner

COOLING DEVICE

CROSS-REFERENCE TO RELATED APPLICATIONS

This U.S. non-provisional patent application claims priority under 35 U.S.C. § 119 of Korean Patent Application Nos. 10-2016-0142205, filed on Oct. 28, 2016, and 10-2017-0042091, filed on Mar. 31, 2017, the entire contents of which are hereby incorporated by reference.

BACKGROUND

The present disclosure herein relates to a cooling device, and more particularly, to a cooling device that includes a temperature-responsive material.

From electronic devices to biological tissue, most systems generate heat. When heat is not efficiently dissipated from an electronic device, the circuitry is burned or degraded such that performance decreases dramatically, and when heat is not efficiently dissipated from biological tissue, protein denaturation occurs such that inherent functions cannot be exhibited. Thus, it is necessary to maintain temperatures by implementing cooling systems in order to prevent such occurrences. In particular, for the development of the IoT industry and for utilization in next generation technology such as thermoelectric generation using body temperature, it is necessary to develop new cooling systems optimized for such environments. It may be necessary to install cooling systems in environments, such as the body or electronic circuits, in which various curvatures coexist, or to manufacture cooling systems in the form of thin films to enable integration and/or for convenience. Moreover, techniques for manufacturing cooling systems in attachable or wearable forms by miniaturizing entire systems are also in demand. From this vantage point, most cooling systems developed up to this point are limited in terms of application thereof to such new technologies.

Existing cooling systems can be divided into active types and passive types according to whether or not the cooling system is capable of cooling to temperatures equal to or below the temperature of a heat-generating part. Methods utilizing the phase transitions of coolants, and Peltier devices are representative of active types, while passive types may include water cooling methods, in which low-temperature water is force-circulated to a boundary with a heat source, methods in which fans are used to increase convective heat transfer, heat sinks which increase heat transfer surface area, heat pipes which transfer heat to the outside, etc. Such techniques have respective advantages and disadvantages, and thus are used in varied ways according to the applications in which the techniques are used, but as discussed above, it is difficult to apply such techniques to next generation technology due to limitations with regard to manufacturing miniaturized and attachable or wearable forms while maintaining performance and ease of use.

SUMMARY

The present disclosure provides an active type cooling device in which a structure is capable of performing self-temperature control.

Objects of the present disclosure are not limited to the object described above. Other objects which are not described above will be clearly understood by a person skilled in the art from the description below.

In order to achieve said objectives, a cooling device according to embodiments of the inventive concept includes a valve structure including a temperature-responsive material that changes in volume in response to changes in temperature; and a supporting structure, which is joined to the valve structure and supports the valve structure, wherein a portion of a solvent contacts the valve structure and another portion of the solvent is externally exposed, the valve structure changes in volume in response to changes in temperature and thereby regulating the externally exposed surface area of the solvent.

In an embodiment, the cooling device may be regulated such that when the temperature rises above a predetermined reference temperature, the volume of the valve structure contracts, thereby increasing the exposed surface area of the solvent, and when the temperature falls below the reference temperature, the volume of the valve structure expands, thereby decreasing the exposed surface area of the solvent In an embodiment, the supporting structure may include openings.

In an embodiment, at least a portion of the valve structure may be externally exposed; and the cooling device may further include a cover film disposed on the externally exposed valve structure.

In an embodiment, the valve structure may be joined with and provided above the supporting structure; and the solvent may be provided between the openings and in contact with the bottom surface of the valve structure, the cooling device may further include a cover film disposed on the top surface of the valve structure.

In an embodiment, the valve structure may be joined with and provided below the supporting structure; and the valve structure may be provided on the solvent, the cooling device may further include a cover film disposed on the supporting structure and on the valve structure top surface externally exposed by the openings.

In an embodiment, the valve structure may include a plurality of unit valve structures, which include intersection parts and line parts, the intersection parts of adjacent unit valve structures being connected with each other, and the line parts of adjacent unit valve structures being connected with each other.

In an embodiment, the valve structure may include a plurality of unit valve structures, which include first and second line parts, the first and second line parts being disposed facing each other with respect to central axes of the first and second line parts In an embodiment, the solvent may be water; and the temperature-responsive material may include a hydrogel.

In an embodiment, the supporting structure may include a non-temperature-responsive material that does not change in volume in response to changes in temperature.

In an embodiment, the temperature-responsive material may include poly(N-isopropylacrylamide) (PNIPAm).

Specific features of other embodiments are included in the detailed description and in the drawings.

DETAILED DESCRIPTION

Advantages and features of the inventive concept, and methods for achieving the same will be made clear through reference to the accompanying drawings and embodiments described in detail below. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. The inventive concept is defined only be the scope of the claims. Like reference numerals refer to like elements throughout.

The terminology used herein is for the purpose of describing particular embodiments only and is not intended to be limiting of the invention. As used herein, the singular forms, "a", "an" and "the" are intended to include the plural forms as well, unless the context clearly indicates otherwise. Terms "comprises" and/or "comprising", when used in this specification, specify the presence of stated elements, steps, operations, and/or components, but do not preclude the presence or addition of one or more other elements, steps, operations, and/or components.

Moreover, embodiments described in the specification are described with reference to exemplary cross-sectional and/or plane views. In the drawings, the thicknesses of films and regions are exaggerated for clarity of illustration. Accordingly, the forms displayed in the exemplary views may be modified due to manufacturing processes and/or tolerances. Therefore, embodiments of the inventive concept are not limited to the specific forms illustrated herein, but also include modifications resulting from manufacturing processes. Accordingly, exemplary regions in the drawings are schematic in nature, and the shapes of exemplary regions in the drawings are for exemplifying particular forms of regions of elements, and not intended to limit the scope of the inventive concept.

Figure 1A:
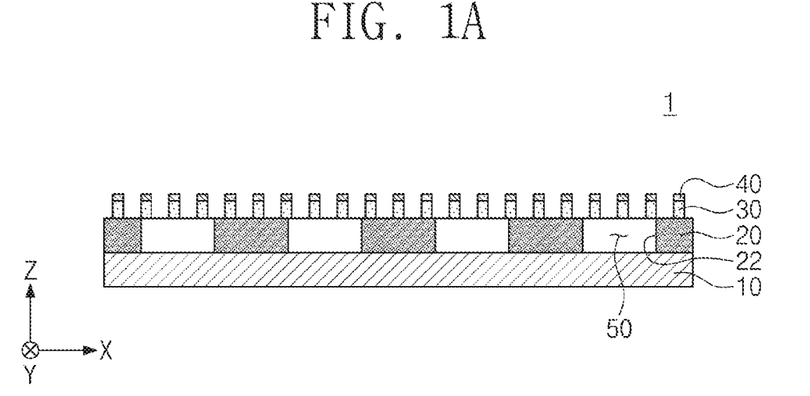
FIG. 1A schematically illustrates a cooling device according to an embodiment of the inventive concept.

FIG. 1A schematically illustrates a cooling device 1 according to an embodiment of the inventive concept. A cooling device 1 may carry out a cooling function by using the temperature-dependent volume change of a temperature-responsive material to regulate the amount of evaporation of a solvent. Hereinafter, in the present disclosure, a first direction X, a second direction Y perpendicular to the first direction X, and a third direction Z perpendicular to the first direction X and the second direction Y are defined and thereby described.

Referring to FIG. 1A, a cooling device 1 may include a supporting substrate 10, a supporting structure 20, a valve structure 30, a cover film 40, and a solvent 50. The supporting substrate 10 may support the supporting structure 20 and provide a space that accommodates the solvent 50. However, conversely, the supporting substrate 10 may be omitted.

The supporting structure 20 may be provided on the supporting substrate 10. The supporting structure 20 may include a plurality of openings 22. The supporting structure 20 may include materials that do not change in volume in response to changes in temperature. The supporting structure 20 may include non-temperature-responsive materials that do not change in volume in response to changes in temperature. The non-temperature-responsive materials may be non-temperature-responsive polymers. For example, the supporting structure 20 may include polyurethane acrylate (PUA). However, the supporting structure 20 which is a material that does not change in volume in response to changes in temperature is not limited to polymers.

The valve structure 30 may be provided on the supporting structure 20. The valve structure 30 may be provided above the supporting structure 20. At least a portion of the valve structure 30 may be externally exposed. The valve structure 30 may be joined and thereby integrated with the supporting structure 20.

The valve structure 30 may include a temperature-responsive material that changes in volume in response to changes in temperature. The temperature-responsive material may be a temperature-responsive polymer. The temperature-responsive material may include a hydrogel. For example, the valve structure 30 may include poly(N-isopropylacrylamide) (PNIPAm). Conversely, the valve structure 30 may include hydroxypropyl cellulose, poly(N-vinyl lactam), polyvinyl methyl ether, or mixtures thereof.

The cover film 40 may be disposed on the valve structure 30. As in FIG. 1A, when the valve structure 30 is joined with and above the supporting structure 20, the cover film 40 may be provided on the top surface of the valve structure 30. The cover film 40 may include a stretchable material.

The solvent 50 may be provided between openings 22 in the supporting structure 20 on the supporting substrate 10. The solvent 50 may be provided so as to contact the valve structure 30. A portion of the solvent 50 may contact the valve structure 30 while another portion may be externally exposed. As in FIG. 1A, a portion of the solvent 50 may contact the bottom surface of the valve structure 30 and another portion may be externally exposed through gaps in the valve structure 30.

For example, the solvent may be water. Due to the latent heat of water, when water is used as the solvent, about two to three times of the heat (For example, about 10 mW/cm$^2$) generated by the human body can be cooled by the amount of water that naturally evaporates in a typical everyday environment (relative humidity of 50%, 25° C., flow rate of 1.5 m/s). Moreover, since the amount of water consumed (For example, about 60 μl/cm$^2$) is extremely small, it is available as an independent system.

Figure 1B:
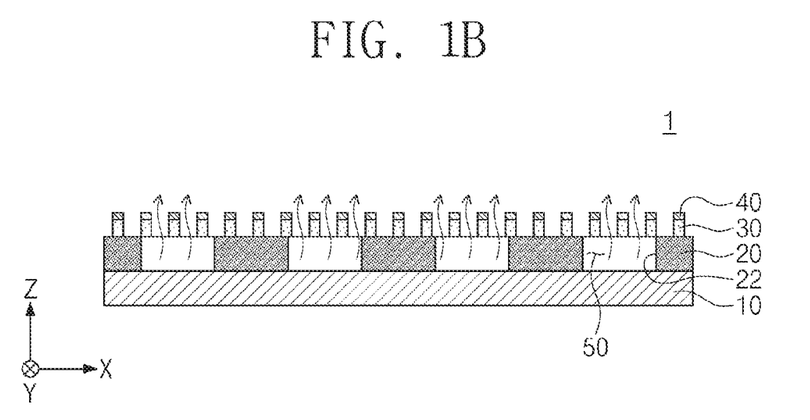
FIGS. 1B and 1C illustrate processes by which the cooling device of FIG. 1A operates.
Figure 1C:
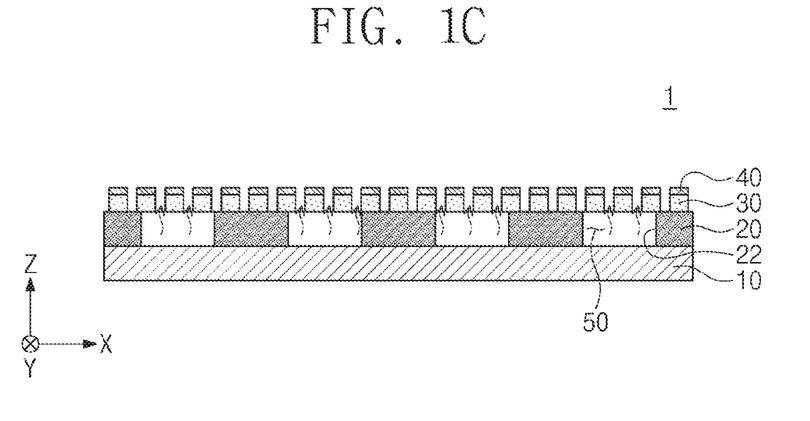

FIGS. 1B and 1C illustrate processes by which the cooling device 1 of FIG. 1A operates. Arrows in FIGS. 1B and 1C indicate evaporation of a solvent 50, and the respective lengths of the arrows may be proportional to the amount of evaporation of the solvent 50.

Referring to FIGS. 1B and 1C, a valve structure 30 changes in volume in response to changes in temperature, and thereby, the externally exposed surface area of a solvent 50 may be adjusted. For example, the surface energy of the valve structure 30 may change in response to changes in temperature, and thus the valve structure 30 may have selectively hydrophilic or hydrophobic. When the valve structure 30 has hydrophilic, the amount of the solvent 50 contained in the valve structure 30 may increase such that the total volume of the valve structure 30 increases. Conversely, when the valve structure 30 has hydrophobic, the amount of the solvent 50 contained in the valve structure 30 may decrease such that the total volume of the valve structure 30 decreases.

According to changes in the volume of the valve structure 30, the externally exposed surface area of the solvent 50 may be controlled, and the amount of the solvent 50 which is evaporated may be controlled. For example, as in FIG. 1B, when the temperature rises above a predetermined reference temperature, the volume of the valve structure 30 may contract such that the externally exposed surface area of the solvent 50 increases and the amount of solvent 50 that evaporates increases. The amount of solvent 50 that evaporates may increase, thereby facilitating the cooling function of a cooling device 1. Conversely, as in FIG. 1C, when the temperature falls below the reference temperature, the volume of the valve structure 30 may increase such that the externally exposed surface area of the solvent 50 decreases and the amount of solvent 50 that evaporates decreases. The amount of solvent 50 that evaporates may be suppressed, thereby suppressing the cooling function of the cooling device 1.

The reference temperature may change according to the type of temperature-responsive material making up the valve structure 30. For example, when the valve structure 30 includes poly(N-isopropylacrylamide) (PNIPAm), the reference temperature may be about 32° C.

Volume changes in the valve structure 30 may occur substantially on the X-Y plane. In other words, the change in area on the X-Y plane of the valve structure 30 may be greater than the change in area in the Z-axis direction of the valve structure. Internal stress generated by the volume expansion resulting from the temperature change may be induced as bending strain in the valve structure 30 such that surface area changes are greater in openings 22 in the X-Y plane. Therefore, the amount of the volume change in the valve structure 30 is extremely small in the Z-axis direction, and the volume change in the valve structure 30 may be considered to occur mainly on the X-Y plane. Conversely, when the amount of the volume change in the valve structure 30 is large in the Z-axis direction, the valve structure 30 may become curved such that it is impossible to maintain the shape of the cooling device 1.

Figure 2A:
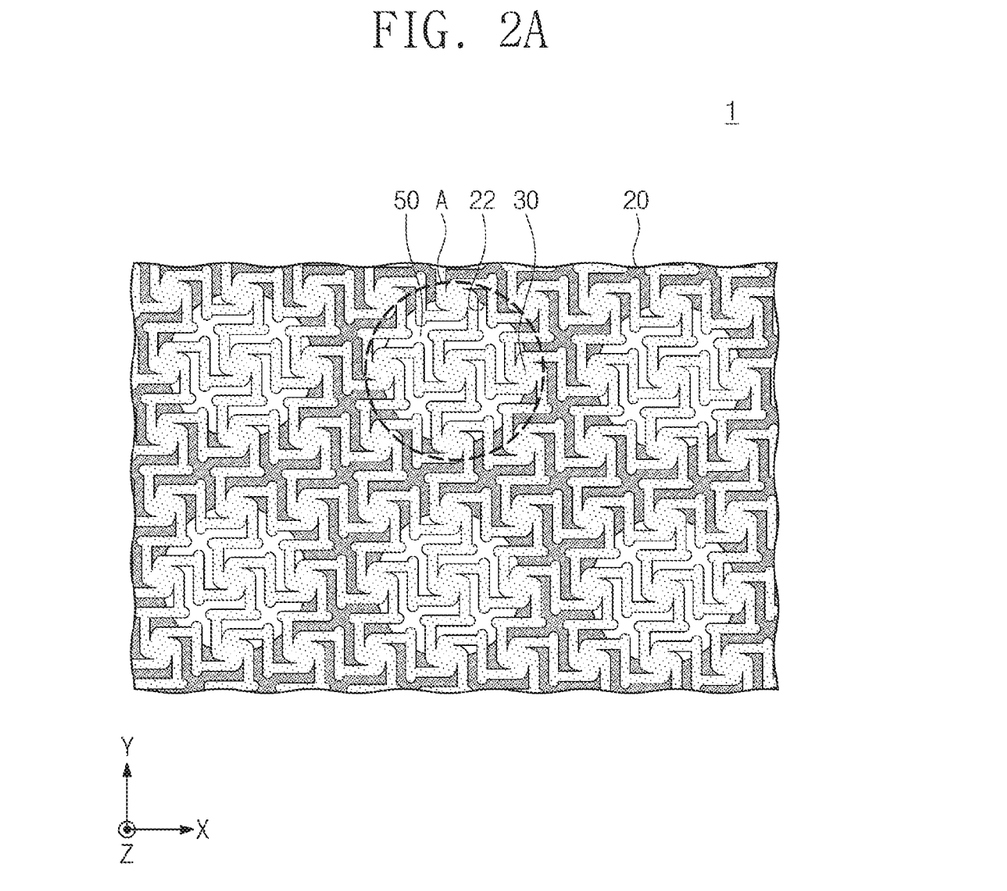
FIG. 2A is a plane view according to an embodiment of the cooling device of FIG. 1A.
Figure 2B:
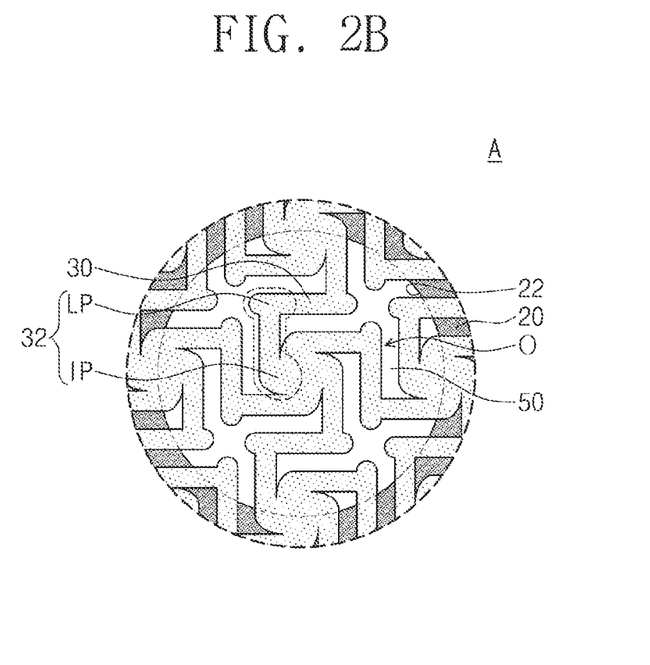
FIG. 2B is an enlarged view of A in FIG. 2A, and illustrates a case in which the temperature of a cooling device rises above a reference temperature.
Figure 2C:
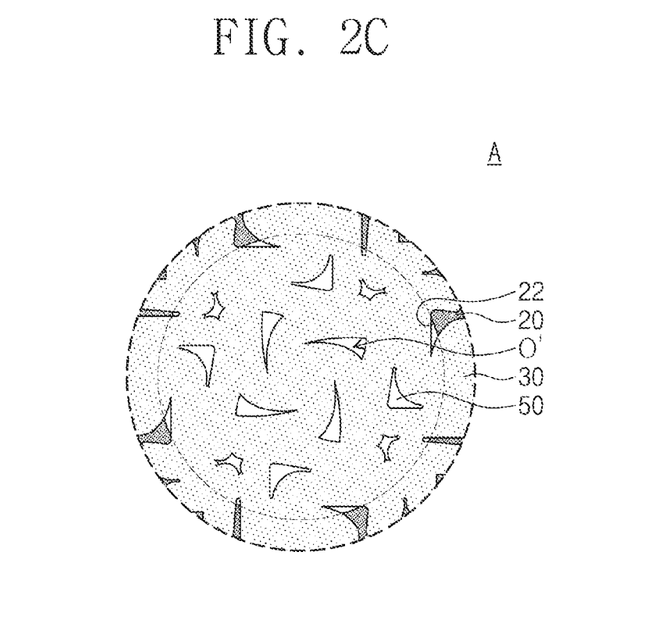
FIG. 2C is an enlarged view of A in FIG. 2A, and illustrates a case in which the temperature of a cooling device falls below a reference temperature.

FIG. 2A is a plane view according to an embodiment of the cooling device 1 of FIG. 1A. FIGS. 2B and 2C are enlarged views of A in FIG. 2A. FIG. 2B represents a case in which the temperature of the cooling device 1 rises above a reference temperature, and FIG. 2C represents a case in which the temperature of the cooling device 1 falls below a reference temperature.

Referring to FIGS. 2A and 2B, a valve structure 30 may include a plurality of unit valve structures 32. The valve structure 30 may have a structure in which the plurality of unit valve structures 32 are continuously repeated. The unit valve structures 32 may include intersection parts IP and line parts LP. The intersection parts IP of adjacent unit valve structures 32 may be connected with each other, and the line parts LP of adjacent unit valve structures 32 may be connected with each other. The line parts LP may include multiple lines and be provided in various forms, such as straight lines and/or curved lines etc.

Referring to FIGS. 2B and 2C, it may be observed that the unit valve structures 32 change in volume in response to changes in temperature. Referring to FIG. 2B, when the temperature rises above a predetermined reference temperature, the volume of the valve structure 30 contracts such that the externally exposed surface area O of a solvent 50 increases. Referring to FIG. 2C, when the temperature falls below the reference temperature, the volume of the valve structure 30 may increase such that the externally exposed surface area O' of the solvent 50 decreases.

Figure 3A:
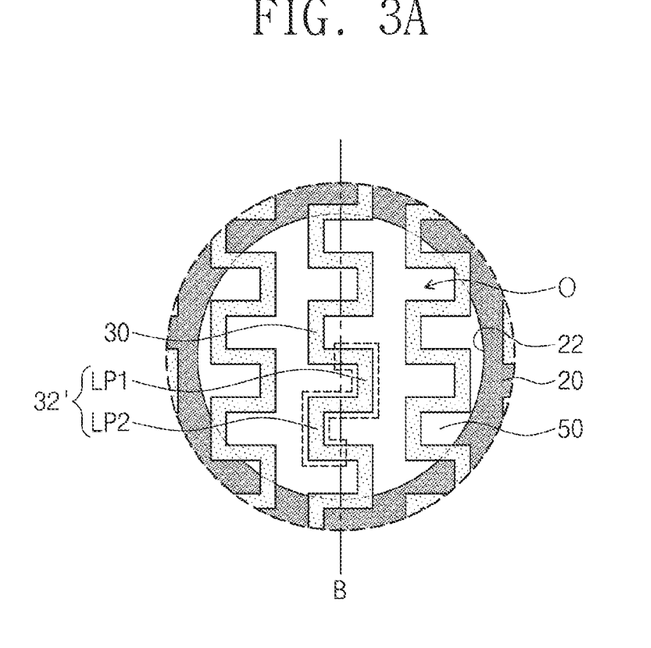
FIGS. 3A and 3B illustrate unit valve structures according to an embodiment of the inventive concept.
Figure 3B:
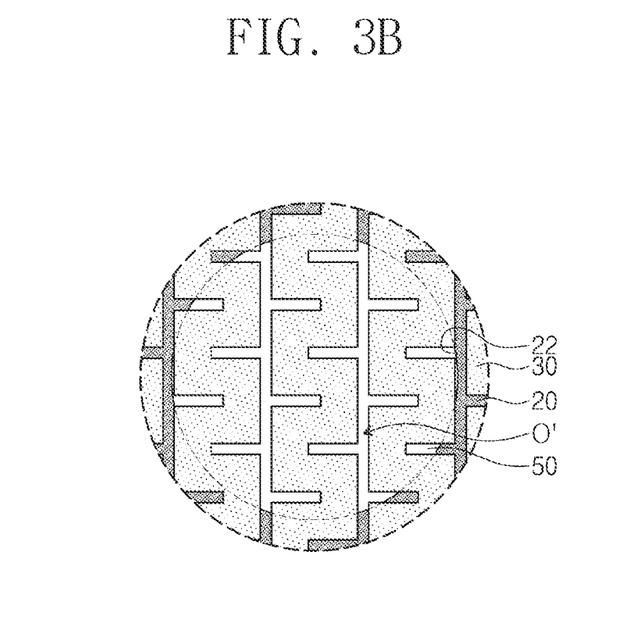

FIGS. 3A and 3B illustrate unit valve structures 32' according to an embodiment of the inventive concept. A valve structure 30 may include a plurality of the unit valve structures 32'. The valve structure 30 may have a structure in which the plurality of unit valve structures 32' are continuously repeated.

The unit valve structures 32' may include first line parts LP1 and second line parts LP2. The first line parts LP1 and second line parts LP2 may be disposed facing each other with respect to central axes B of the unit valve structures 32'. The second line part LP2 of one unit valve structure 32' may be connected with the first line part LP1 of an adjacent unit valve structure 32'. Each of the first line part LP1 and second line part LP2 may include multiple lines and be provided in various forms, such as straight lines and/or curved lines, etc.

FIGS. 4A to 4H illustrate processes for manufacturing the cooling device 1 of FIG. 1.

Figure 4A:
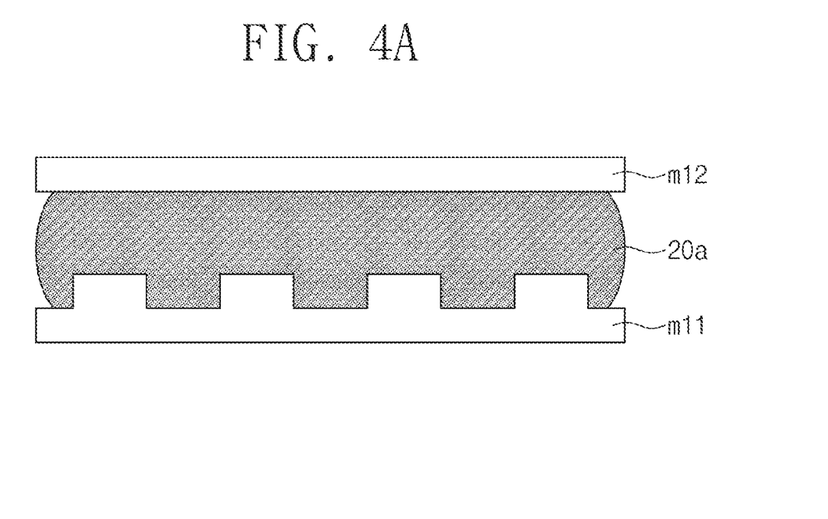
FIGS. 4A to 4H illustrate processes for manufacturing the cooling device of FIG. 1.
Figure 4B:
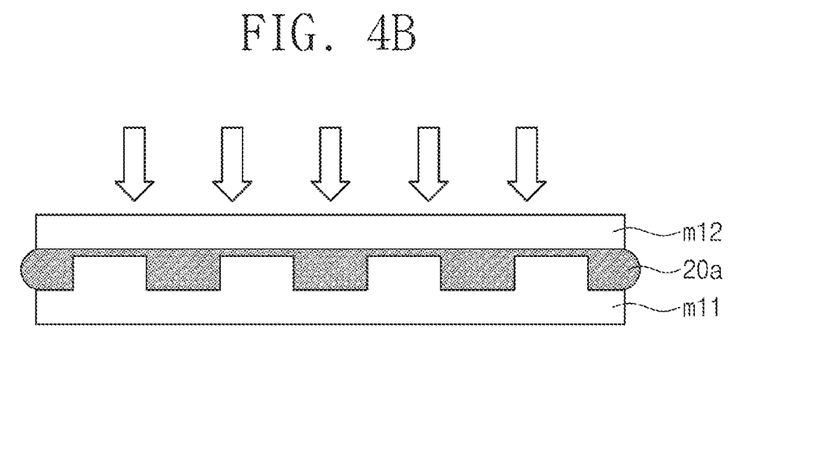
Figure 4C:
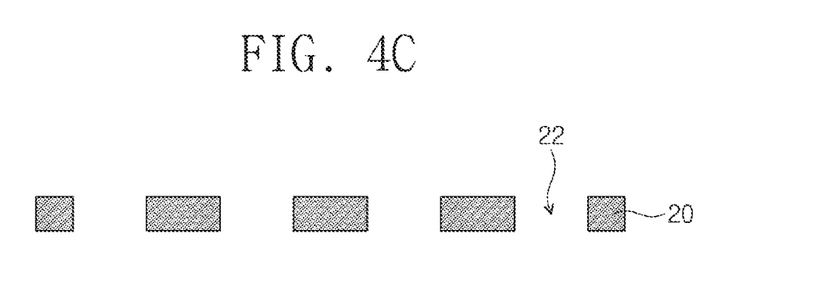

Referring to FIGS. 4A to 4C, a supporting structure 20 may be formed. More specifically, the supporting structure 20 may be formed of a second material 20a that does not change in volume in response to changes in temperature. The second material 20a may be a non-temperature-responsive material. For example, the second material 20a may include polyurethane acrylate (PUA). However, the second material 20a is not limited thereto and may include various materials that do not change in volume in response to changes in temperature.

After providing the second material 20a to a first mold part m11 and m12 (see FIG. 4A), the second material 20a may be compressed and a curing process may be carried out. Here, the curing process may be carried out by UV radiation (see FIG. 4B). The supporting structure 20 may be formed by partially curing the second material 20a (see FIG. 4C). For example, a core part of the supporting structure 20 may be cured and an edge part may be incompletely cured. The supporting structure 20 may include a plurality of openings 22.

Figure 4D:
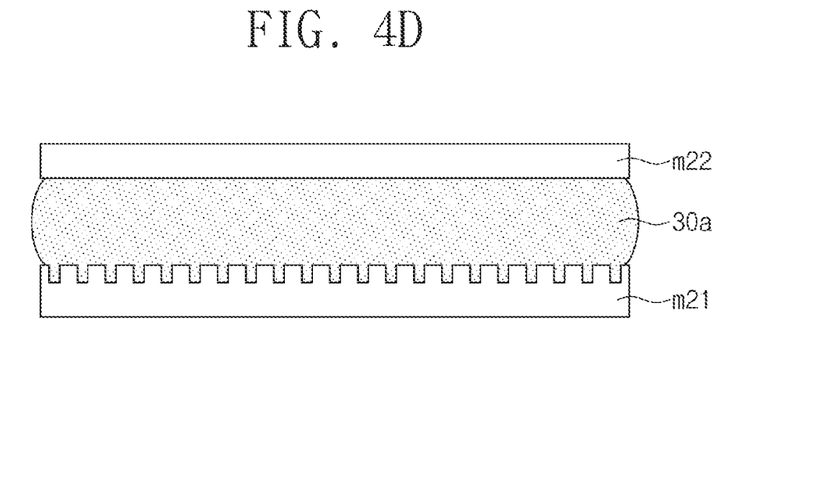
Figure 4E:
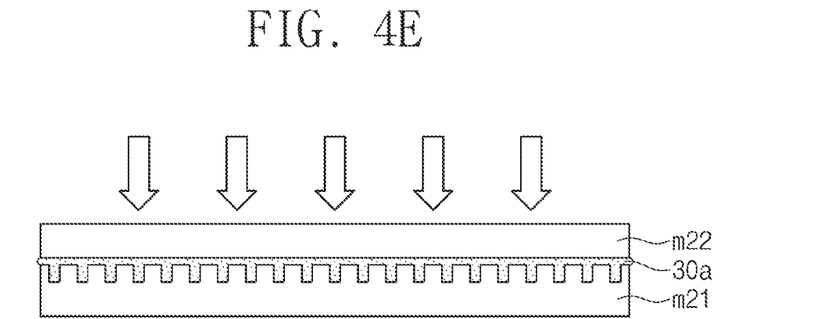
Figure 4F:
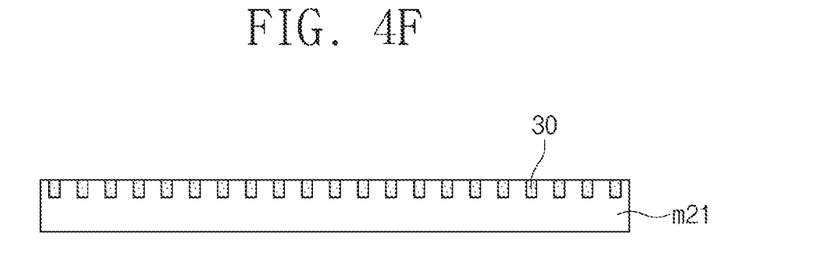

Referring to FIGS. 4D to 4F, a valve structure 30 may be formed. More specifically, the valve structure 30 may be formed of a first material 30a having a volume that changes in response to changes in temperature. The first material 30a may be a temperature-responsive material. For example, the first material 30a may include poly(N-isopropylacrylamide) (PNIPAm). However, the first material 30a is not limited thereto, and may include hydroxypropyl cellulose, poly(N-vinyl lactam), polyvinyl methyl ether, or mixtures thereof.

After providing the first material 30a to a second mold part m21 and m22 (see FIG. 4D), the first material 30a may be compressed and a curing process may be carried out. Here, the curing process may be carried out by UV radiation (see FIG. 4E). The valve structure 30 may be formed by partially curing the first material 30a (see FIG. 4F). For example, a core part of the valve structure 30 may be cured and an edge part may be incompletely cured.

Figure 4G:
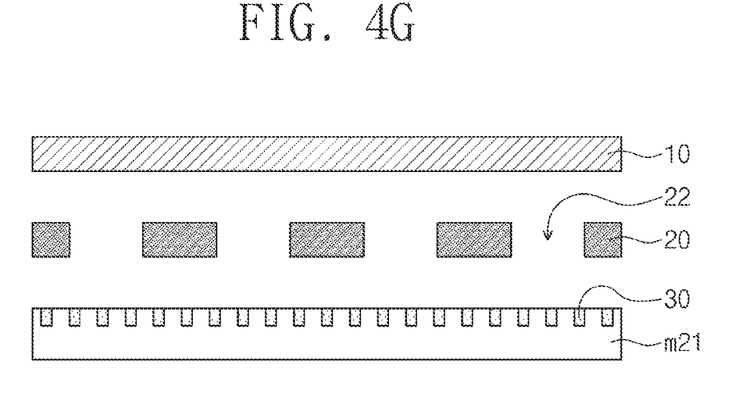

Referring to FIG. 4G, a supporting substrate 10, the valve structure 30, and the supporting structure 20 may be joined. Joining of the valve structure 30 and the supporting structure 20 may include joining the partially cured valve structure 30 and the supporting structure 20, and curing. For example, the valve structure 30 and the supporting structure 20 may be chemically bonded by completely curing the valve structure 30, having incompletely cured edge parts, and the supporting structure 20. Here, the curing process may be carried out by UV radiation. After the curing process has been completed, the second mold m21 joined to the valve structure 30 may be removed.

Figure 4H:
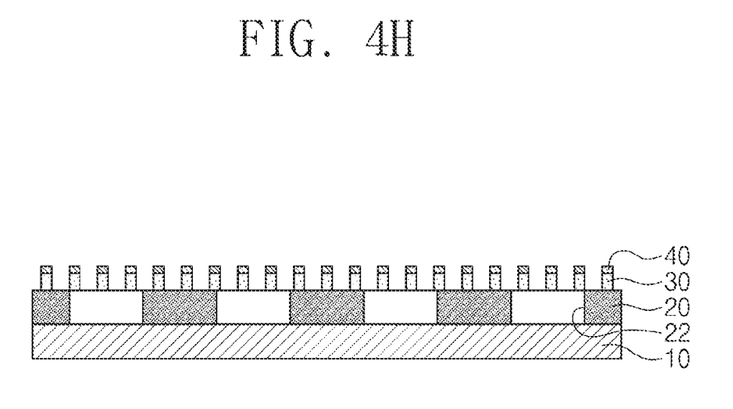

Referring to FIG. 4H, a cover film 40 may be coated on the externally exposed valve structure 30. The cover film 40 may be coated on the top surface of the valve structure 30. The cover film 40 may include a stretchable material. The cover film 40 may prevent the evaporation of a solvent 50 through the valve structure 30. Thus, the amount of the solvent 50 that evaporates may be controlled according to the externally exposed surface area of the solvent 50, which depends on the volume change in the valve structure 30. Although not shown, the cover film 40 may also be coated on side surfaces of the valve structure 30.

Subsequently, the cooling device 1 in FIG. 1A may be completed by providing the solvent 50 to the openings 22 in the supporting structure 20 of the supporting substrate 10. The solvent 50 may be provided so as to contact the bottom surface of the valve structure 30. The solvent 50 may include water.

According to the inventive concept, an active type cooling device is provided in which a structure can perform self-temperature control. Cooling devices according to embodiments of the inventive concept may be manufactured in forms that are miniaturized and attachable or wearable, while maintaining ease of use.

Figure 5:
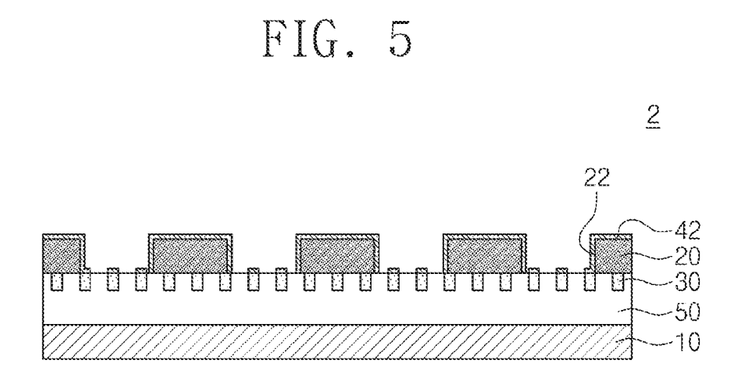
FIG. 5 schematically illustrates a cooling device according to an embodiment of the inventive concept.

FIG. 5 schematically illustrates a cooling device 2 according to an embodiment of the inventive concept. Features substantially identical to the cooling device 1 described with reference to FIGS. 1A to 3B are provided using identical reference numerals, and repeated descriptions may be excluded for conciseness of description.

Referring to FIG. 5, in a cooling device 2, a valve structure 30 may be joined with and provided below a supporting structure 20. A solvent 50 may be provided on a supporting substrate 10, and the valve structure 30 may be provided on the solvent 50. A cover film 42 may be disposed on the supporting structure 20 and the top surface of the valve structure 30 externally exposed between openings 22. Conversely, the cover film 42 may also be provided on side surfaces and/or the bottom surfaces of the valve structure 30 externally exposed between the openings 22.

According to embodiments of the inventive concept, an active type cooling device is provided in which a structure can perform self-temperature control. Cooling devices according to embodiments of the inventive concept may be manufactured in forms that are miniaturized and attachable or wearable, while maintaining ease of use.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed. Thus, the embodiments described above are in every way exemplary, and should not be construed as limiting.

What is claimed is:

1. A cooling device comprising:
a valve structure including a temperature-responsive material that changes in volume in response to changes in temperature; and
a supporting structure, which is joined to the valve structure and supports the valve structure,
wherein a portion of a solvent contacts the valve structure and another portion of the solvent is externally exposed, and
the valve structure changes in volume in response to changes in temperature, thereby regulating an externally exposed surface area of the solvent,
wherein the valve structure includes a plurality of unit valve structures, which include intersection parts and line parts, the intersection parts of adjacent unit valve structures being connected with each other, and the line parts of adjacent unit valve structures being connected with each other.

2. The cooling device of claim 1, wherein the cooling device is regulated such that when the temperature rises above a predetermined reference temperature, the volume of the valve structure contracts, thereby increasing the exposed surface area of the solvent, and when the temperature falls below the reference temperature, the volume of the valve structure expands, thereby decreasing the exposed surface area of the solvent.

3. The cooling device of claim 1, wherein the supporting structure includes openings.

4. The cooling device of claim 1, wherein at least a portion of the valve structure is externally exposed; and
the cooling device further includes a cover film disposed on the at least the portion of the valve structure externally exposed.

5. The cooling device of claim 3, wherein the valve structure is joined with and provided above the supporting structure; and
the solvent is provided between the openings and in contact with a bottom surface of the valve structure,
the cooling device further includes a cover film disposed on a top surface of the valve structure.

6. The cooling device of claim 3, wherein:
the valve structure is joined with and provided below the supporting structure; and
the valve structure is provided on the solvent,
the cooling device further includes a cover film disposed on the supporting structure and on a valve structure top surface externally exposed by the openings.

7. The cooling device of claim 1, wherein the valve structure includes a plurality of unit valve structures, which include first and second line parts, the first and second line parts being disposed facing each other with respect to central axes of the first and second line parts.

8. The cooling device of claim 1, wherein the solvent is water; and
the temperature-responsive material includes a hydrogel.

9. The cooling device of claim 1, wherein the supporting structure includes a non-temperature-responsive material that does not change in volume in response to changes in temperature.

10. The cooling device of claim 1, wherein the temperature-responsive material includes poly(N-isopropylacrylamide) (PNIPAm).

* * * * *